UNITED STATES PATENT OFFICE.

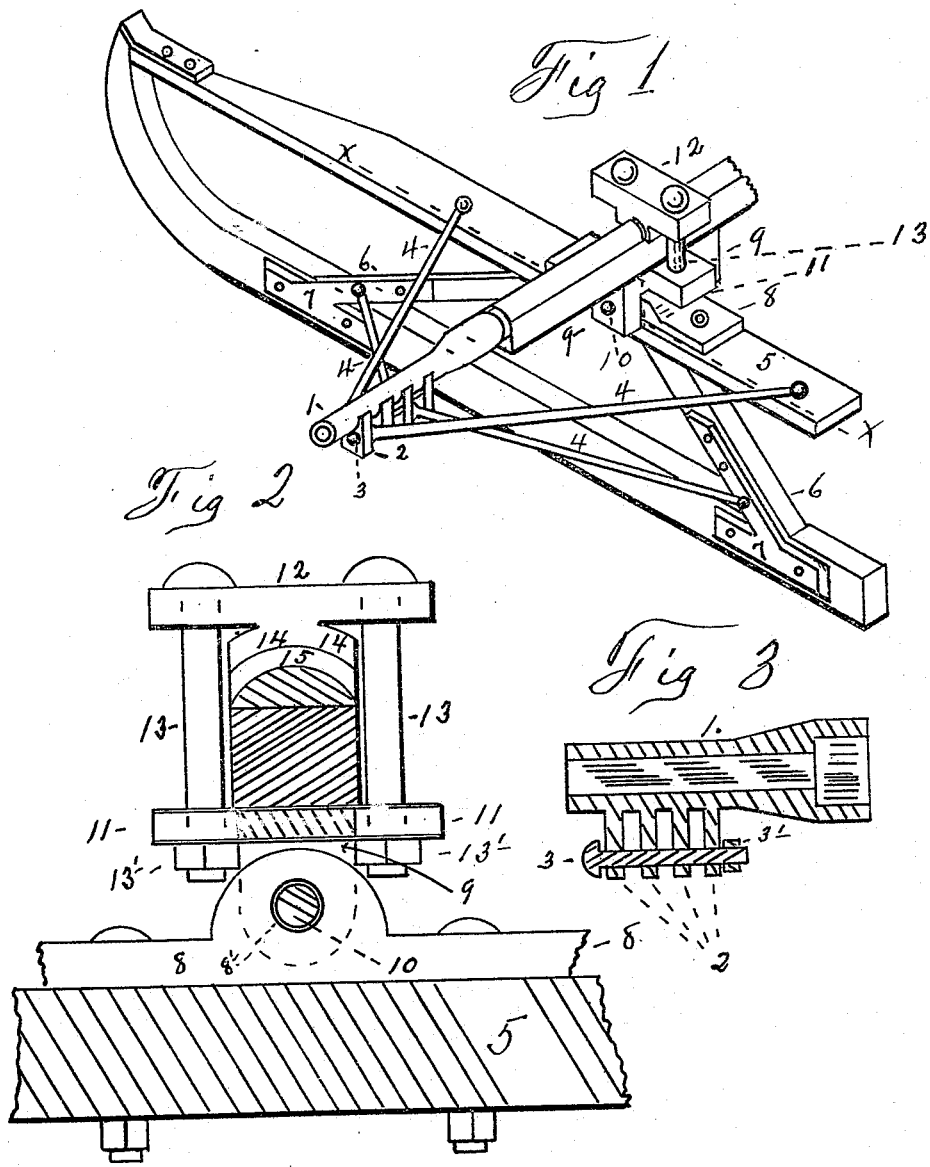

WESLEY SIBBREL, OF FREMONT, OHIO.

SLEIGH-RUNNER.

SPECIFICATION forming part of Letters Patent No. 553,215, dated January 14, 1896.

Application filed February 11, 1895. Serial No. 538,058. (No model.)

*To all whom it may concern:*

Be it known that I, WESLEY SIBBREL, a citizen of the United States, residing at Fremont, in the county of Sandusky and State of Ohio, have invented certain new and useful Improvements in Sleigh-Runners, of which the following is a full, clear, and exact description.

Heretofore much complaint has been made by the owners of fine vehicles who have used such runners as have heretofore been designed to follow the sleigh-track, both because of their chafing the wood-stock and paint upon the axle and because of the oscillation of the sleeve upon the spindle scratching and wearing the same. In my invention I have overcome both of these objections by perfecting a runner which neither chafes the wood-stock or paint nor oscillates upon the axle. I accomplish this in part by providing a sleeve which is a little longer than the spindle, so that when the nut upon the end of the spindle is tightened with a wrench the sleeve becomes jammed against the shoulder of the axle and is thus held free from turning. The ordinary tie-rods or braces which extend from the runner-knees and raves to the sleeve I provide with eyes at their outer extremities, which have their direction in line with the axle, and I provide lugs upon the lower side of said sleeve so adapted that a bolt may pass through said lugs and eyes in horizontal line with the pivot about which the runner is made to oscillate, by means of which said tie-rods or braces are permitted to oscillate freely with the runner to which they are secured, and the whole thus oscillating with a common axis all torsional strain is removed from the clip which secures the axle to the runner. In addition to this the clip which I use for securing the runner to the axle has a tie which is provided with leaves suitable to be readily conformed to the wood-stock of the axle and which are made to carry a suitable cushion to receive the pressure of the tie and prevent direct contact of the tie with the wood.

In the drawings, Figure 1 shows my invention attached to an ordinary runner. Fig. 2 shows a vertical cross-section of the axle and wood-stock on the line $x\,x$ of the Fig. 1, cutting off one of the lugs from the shackle. The other lug is seen partly above and partly in dotted outline through the bed-plate. Fig. 3 shows a vertical longitudinal section of the sleeve and lugs, showing the recess upon the inner side of the sleeve provided to receive the shoulder of the axle and the shoulder-jamb, against which it is made to engage when the nut is tightened.

Referring to the several drawings, 1 is the sleeve, 2 2 2 2 the several projecting lugs projecting out from said sleeve, and 3 is a suitable threaded bolt provided with a nut 3' and which when in place forms a pivot about which the braces 4 4 4 4 are made to oscillate. The series of braces are provided at one end with an eye adapted to receive the bolt 3 and permit of oscillation, while at the other ends they are suitably made fast to the several parts of the runner to which they pertain. A bed-plate 8 is securely bolted to the upper side of the sled-rave 5. An ordinary carriage-shackle 11, with bolts and nuts 13 13 and 13' 13', is made to form a clip, and the same, by means of the clip-tie 12, is secured to the axle, while a suitable bolt 10 is made to pass through eyes in the lugs 9 9 of said shackle, and through a suitable aperture or bearing 8' in said bed-plate, thus forming a pivot about which said runner is free to oscillate. The several parts are so adapted and disposed that the bolt 10 and the bolt 3 have the same horizontal plane and a common axis.

The tie 12 is provided with leaves 14 14, which carry the cushion 15, and the same are preferably secured together by suitable rivets, the heads of which sink into the bed of the cushion.

The clip-tie 12 is constructed with one side plain and adapted to be reversed when required to make fast to an axle without wood or the common square axle.

Having now described my invention, what I claim as new, and desire to secure by Letters Patent, is—

1. In a sleigh runner adapted to be made fast to a carriage axle a sleeve provided with two pairs of depending lugs with bearings therein in combination with two sets of brace or tie rods secured at one end to parts of said runner and at the other end to said lugs by a pivotal bolt arranged beneath the axle and in line therewith substantially as and for the purpose set forth.

2. A clip tie 12 provided with leaves carrying a cushion.

3. A bed plate 8 in combination with a threaded bolt and nut 10 a carriage shackle 11 with bolts and nuts 13—13 and 13'—13' and the clip tie 12 all substantially as and for the purpose set forth.

WESLEY SIBBREL.

Witnesses:
   FRANK J. TUTTLE,
   LOUIS C. HEFLINGER.